United States Patent [19]

Sazaki et al.

[11] Patent Number: 4,923,141
[45] Date of Patent: May 8, 1990

[54] SPINNING REEL HAVING REVERSE ROTATION PREVENTING MECHANISM

[75] Inventors: Konin Sazaki; Kenji Maruyama, both of Hiroshima, Japan

[73] Assignee: Ryobi Ltd., Hiroshima, Japan

[21] Appl. No.: 890,892

[22] Filed: Jul. 28, 1986

Related U.S. Application Data

[63] Continuation of Ser. No. 689,257, Jan. 7, 1985, abandoned.

[30] Foreign Application Priority Data

Jan. 11, 1984 [JP] Japan ............................ 59-2625[U]
Feb. 2, 1984 [JP] Japan ........................... 59-14761[U]

[51] Int. Cl.⁵ ...................... A01K 89/01; A01K 89/02
[52] U.S. Cl. ..................................... 242/247; 242/298
[58] Field of Search ............... 242/247, 248, 230, 298

[56] References Cited

U.S. PATENT DOCUMENTS 4,163,528  8/1979  Egaski et al. ............... 242/84.21 R
4,193,562  3/1980  Gifford ......................... 242/84.2 G
4,208,020  6/1980  Gifford ......................... 242/84.2 G
4,300,730  11/1981  Carlsson et al. ............. 242/84.2 R
4,474,330  10/1984  Sato .............................. 242/84.1 R Primary Examiner—Katherine A. Matecki
Attorney, Agent, or Firm—Sughrue, Mion, Zinn, Macpeak & Seas

[57] ABSTRACT

A spinning reel having a reverse rotation preventing mechanism for selectively preventing the reverse rotation of the rotor of the reel in which the amount of protrusion of an operating lever for setting the rotation preventing state is reduced. A rocker lever pivotably mounted to the reel body has only one actuating portion extending beyond the surface of the reel body when in either operative position, namely, the rotation locked or unlocked position. A forward arm of the rocker lever is pivotably joined to a locking lever, the forward end of which is engageable with a locking gear fixed to the shaft of the rotor. If desired, a locking pawl can be interposed between the forward end of the locking lever and the locking gear.

2 Claims, 2 Drawing Sheets

SPINNING REEL HAVING REVERSE ROTATION PREVENTING MECHANISM

This is a continuation of application Ser. No. 689,257 filed Jan. 7, 1985 and now abandoned.

BACKGROUND OF THE INVENTION

The present invention relates to a spinning-type fishing reel having a mechanism for preventing reverse rotation of the rotor of the reel. More particularly, the invention relates to a mechanism for preventing the reverse rotation of a rotor and related components in a spinning-type fishing reel of a type having a rotor rotatably mounted on a reel body and a spool which both rotates and reciprocates back and forth as the reel handle is turned to wind in the fishing line.

In conventional spinning reels of this type, reverse rotation of the rotor is prevented with the use of a locking gear whereby a locking lever is selectively moved in and out of engagement with the teeth of the locking gear by operation of an actuating lever, a portion of which extends outside the reel body for the fisherman to operate.

Prior art arrangements of the actuating lever include one in which the actuating lever is swingable back and forth in the same directions as the movement of the rotor, one in which the actuating lever is swingable in directions perpendicular to the directions of movement of the winding handle, and one in which the actuating lever is swingable in directions parallel to the directions of movement of the winding lever. Further, as described in U.S. Pat. No. 4,208,020 to Gifford, the actuating lever can be implemented with a pushbutton movable towards and away from the reel body. Also, an arrangement is known whereby the actuating lever is a sliding member, slidable to the right and left of the reel body. In any of these constructions, however, there is an attendant disadvantage that the part of the actuating lever protruding from the reel body tends to interfere with the other operations of the reel, sometimes leading to the fishing line becoming tangled. Also, some of the above-described arrangements make it difficult for the fisherman to operate the actuating lever.

SUMMARY OF THE INVENTION

Accordingly, it is an object of the present invention to provide a spinning-type fishing reel in which the disadvantages and drawbacks of the conventional spinning reels of this type have been eliminated.

Specifically, an object of the present invention is to provide a spinning reel having a reverse rotation preventing mechanism having an actuating lever which does not interfere with the other operations of the reel.

These, as well as other objects of the invention have been met by, the provision of a spinning reel comprising a reel body; a winding handle having a handle shaft and a main gear fixed to the handle shaft; a hollow spindle having a pinion gear at a rear end thereof meshed with the main gear; a sliding shaft extending through a central through-hole in the spindle; an oscillating mechanism coupling the main gear to the spindle; bearing means for mounting the spindle to the reel body so as to be rotatable but not translatable with respect thereof; a rotor mounted on a front end of the spindle; a spool mounted on a forward end of the sliding shaft; a locking gear fixed to the spindle; a locking lever pivotably mounted to the reel body having a forward end engagable with the locking gear; a rocker lever pivotably mounted to the reel body and having first through third arms, the first arm and the second arm being at a rear portion of the rocker lever, the rocker lever being dimensioned such that one and only one of the first and second arms of the rocker lever protrude through a hole in a rear end of the reel body for each of two operative positions of the rocker lever, the third arm extending forwardly of the first and second arms and being pivotably joined to a rear end of the locking lever; and a dead-point spring extending between the third arm of the rocker lever and a rear portion of the locking lever.

DESCRIPTION OF THE PREFERRED EMBODIMENTS

Figure 1:
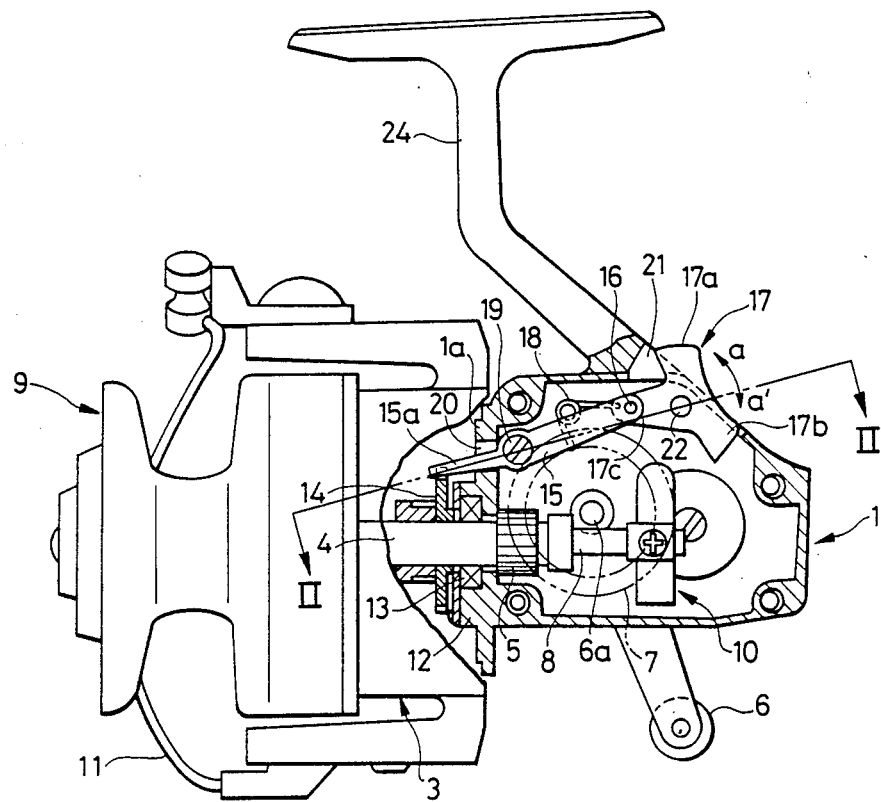
FIG. 1 is a side view, partially cut away and shown in cross section, of a first embodiment of a spinning reel of the present invention.
Figure 2:
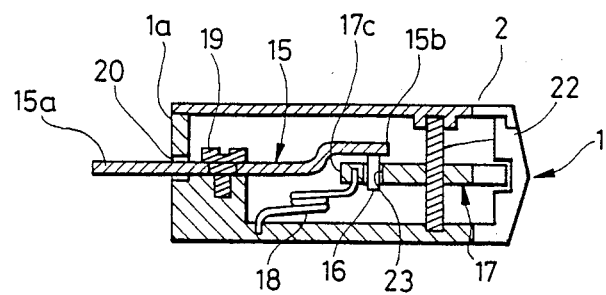
FIG. 2 is an enlarged cross-sectional view of a portion of the operating mechanism of the reel of FIG. 1.

Referring now to FIGS. 1 and 2 of the drawings, a first preferred embodiment of a spinning reel of the invention will be described.

A rotor 3 is rotatably mounted on a reel body 1 via a hollow spindle 4. The reel body 1 is provided with a cover 2. A pinion gear 5 integral with the spindle 4 is engaged with a main gear 7 fixed to a shaft 6a of a winding handle 6. The rotor is thus rotated when the handle 6 is turned, as in a conventional reel of the same general type.

A sliding shaft 8 slidably fitted in a through-hole of the spindle 4 supports at the front end thereof a spool 9. The spindle 4, is rotated and simultaneously reciprocated back and forth by an oscillating mechanism 10 coupled between the main gear 7 and the rear end of the sliding shaft 8. Thereby, the fishing line (not shown) is wound onto the spool 9 while being guided by a bail 11 swingably mounted on the rotor 3.

The spindle 4 is supported by the inner race 13 of a bearing 12 at the position where the spindle 4 passes through a front wall 1a of the reel body 1, in such a manner as to be rotatable but not slidable. A locking gear 14 is fixed to the spindle 4.

In accordance with the invention, an anti-reverse prevention mechanism is provided including a locking lever 15 pivotally mounted at a center portion thereof to the reel body 1 via a stepped screw 19. A front end 15a of the lever 15 is engageable with the teeth of the locking gear 14. A rocker lever 17 is pivotally mounted by the reel body 1 to the rear of the lever 15. The rocker lever 17 has three arms, an upper arm forming an upper actuating portion 17a, a lower arm forming a lower actuating portion 17b, and a middle arm which forms a connecting arm 17c. The upper and lower actuating portions 17a and 17b are accessible to the fisherman through an opening 21 formed in the rear of the reel body 1. However, only one of the upper and lower actuating portions at a time protrudes beyond the surface of the rear of the reel body 1. The rocker lever 17 is pivoted to the reel body 1 via a pin 22 so as to be rockable in the directions indicated by arrows a and a'.

The front end of the connecting arm 17c of the rocker lever 17 is pivotably joined to the rear end of the lever 15 with a pin 16. A dead point spring 18 extends between the lever 15 and the arm 17c. The dead point of the spring 18 occurs about midway of the range of movement of the combined lever 15 and arm 17c.

By depressing the lower actuating portion 17b to bring the rocker lever 17 to the position shown in FIG. 1, the end 15a of the lever 15 will be brought into engagement with the locking gear 14, thus preventing reverse rotation of the rotor 3. On the other hand, when the upper actuating portion 17a is depressed, the connecting arm 17c moves the lever 15 out of engagement with the locking gear, thus allowing reverse rotation of the rotor 17c.

The rocker lever 17 is dimensioned such that, when the actuating portion 17b is depressed, the actuating portion 17b is moved below, or at least flush with, the surface of the reel body 1. Similarly, when the actuating portion 17a is depressed, the actuating portion 17a is moved below, or at least flush with, the surface of the reel body 1. Accordingly, because the total amount of protrusion of the rocker lever 17 from the reel body is quite small, there is, compared with the conventional reels described above, much less chance of any interference with the other operations of the reel.

Figure 3:
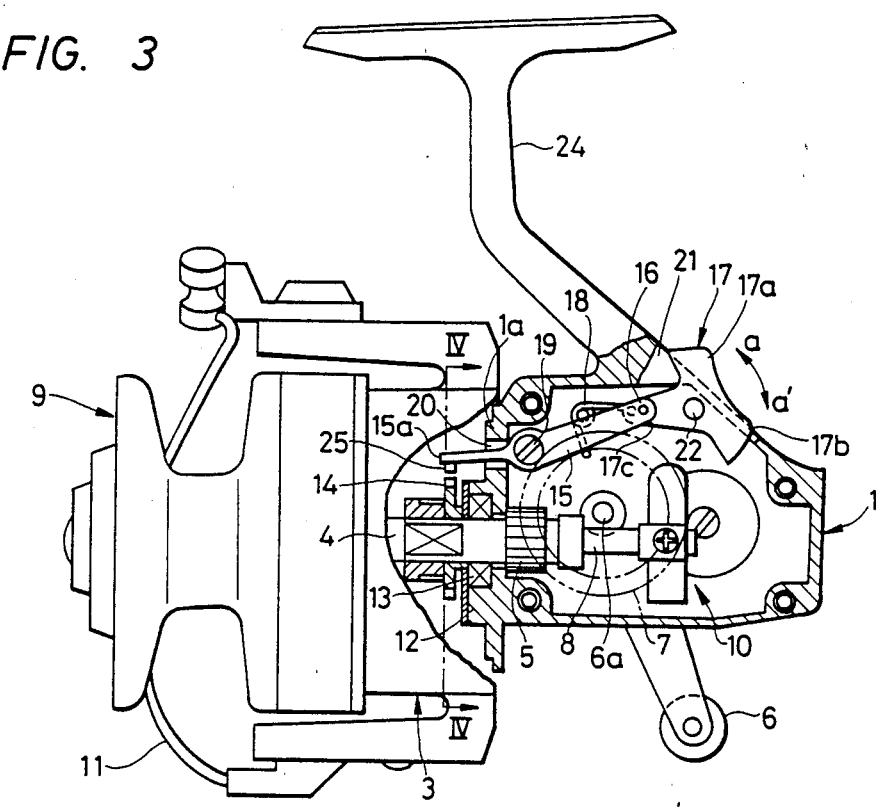
FIG. 3 is a side view, partially cut away and shown in cross section, of a second embodiment of a spinning reel of the present invention.
Figure 4:
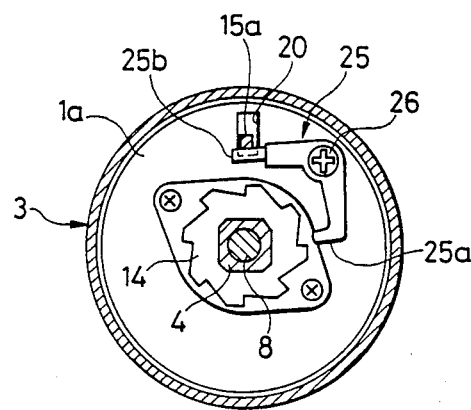
FIG. 4 is a cross-sectional view taken along a line IV—IV in FIG. 3.

A second preferred embodiment of the invention is shown in FIGS. 3 and 4 of the accompanying drawings. This embodiment differs from the first embodiment shown in FIGS. 1 and 2 by the interposition of an L-shaped locking pawl 25 between the end 15a of the lever 15 and the lock gear 14. As seen in FIG. 4, the locking pawl is pivotably mounted to the front wall 1a via a stepped screw 26. The locking pawl 25 has a pawl portion 25a which is engageable with and disengageable from the locking gear 14. Otherwise, the reel of this second embodiment is constructed and operated in the same manner as the first embodiment. Moreover, the same advantages are attained.

This completes the description of the preferred embodiments of the invention. Although preferred embodiments have been described, it is believed that numerous modifications and alterations thereto would be apparent to one of ordinary skill in the art without departing from the spirit and scope of the invention.

We claim:

1. A spinning reel comprising: a reel body, a winding handle having a shaft and a main gear fixed to said handle shaft; a hollow spindle having a pinion gear at a rear end thereof meshed with said main gear; a sliding shaft extending through a central through-hole in said spindle; an oscillating mechanism coupling said main gear to said sliding shaft, bearing means for mounting said spindle to said reel body so as to be rotatable but no translatable with respect thereto; a rotor mounted on a front end of said spindle; a spool mounted on a forward end of said sliding shaft; a locking gear fixed to said spindle; locking lever means pivotably mounted to said reel body and having a forward end engagable with said locking gear, for braking said locking gear; a rocker lever mounted to said reel body for pivotal movement about a first pivot point and having first through third arms, said first arm and said second arm being at a rear portion of said rocker lever, said rocker lever being dimensioned such that one and only one of said first and second arms of said rocker lever protrude through a hole in a rear end of said reel body for each of two operative positions of said rocker lever, said third arm extending forwardly of said first and second arms and being pivotably joined to a rear end of said locking lever means at a second pivot point; wherein said locking lever means comprises a locking lever pivotably joined to said rocker lever at said second pivot point, and being mounted for pivotal movement in a first plane, said locking lever having a forward end extending toward said locking gear, and an L-shaped locking pawl disposed between said forward end of said locking lever and said locking gear, said locking pawl being mounted for pivotal movement in a plane substantially normal to said first plane, one arm of said locking pawl being engagable with said forward end of said locking lever, and an end portion of the other arm of said locking pawl being engagable with said locking gear; and a spring extending between said third arm of said rocker lever and said reel body.

2. The spinning reel of claim 1, wherein said spring comprises a dead-point spring, and wherein the dead point of said dead point spring is located approximately midway of a range of movement of said rocker lever.

* * * * *